Nov. 18, 1969     D. L. PEEPLES     3,478,782
POWERED CONTROL VALVE ASSEMBLY
Filed April 1, 1968

INVENTOR
Denny L. Peeples
BY
D. D. McGraw
ATTORNEY

United States Patent Office 3,478,782
Patented Nov. 18, 1969

3,478,782
POWERED CONTROL VALVE ASSEMBLY
Denny L. Peeples, Dayton, Ohio, assignor to General Motors Corporation, Detroit, Mich., a corporation of Delaware
Filed Apr. 1, 1968, Ser. No. 717,656
Int. Cl. B60t 15/10, 13/46
U.S. Cl. 137—627.5                                 3 Claims

ABSTRACT OF THE DISCLOSURE

In order to multiply a short travel, low force signal such as that generated by the sensing unit of a brake anti-lock system, a powered valve assembly is provided to operate a valve arrangement which requires long travel and high forces. A mainspring powered rotatable cam is utilized and the rotatable position of the cam is selected in accordance with the sensing unit output signals and the desired valve positions. A vacuum powered reversing motor is provided to maintain the mainspring with sufficient stored power to operate the cam. The servomotor acts through a windup ratchet mechanism.

---

Figure 1:
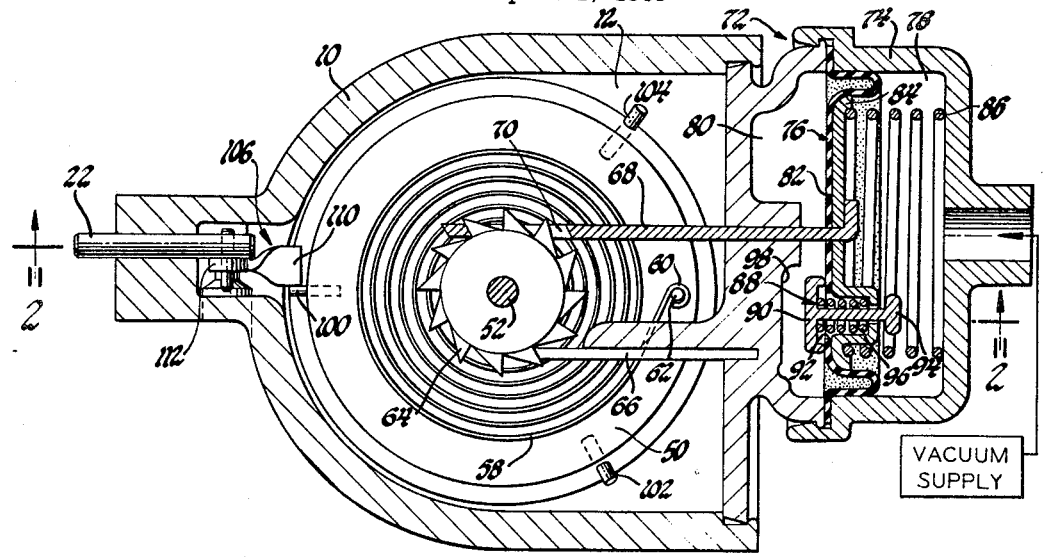

In many units controlled by multiple-position valves, the valves must be positioned throughout a relatively long stroke and at relatively high force levels even though the signals which are provided to control the valve movements are generated at low force levels. Systems of this type include brake anti-lock control systems in which the signals are generated mechanically by means of one or more flywheels (such as the mechanisms disclosed in application Ser. No. 658,420, filed Aug. 4, 1967 by Donald M. Flory, and application Ser. No. 674,389, filed Oct. 11, 1967 by Robert A. Horvath, both of which are assigned to the common assignee), or suitable electrical or fluid sensors which generate signals of this nature. In the structure embodying the invention, the low level signals are utilized to position a control for a movable cam with the cam being provided with sufficient power to actuate the valves being controlled through the required strokes and at the required force levels. The power mechanism for the cam is a mainspring which is kept wound sufficiently to rotate the cam at all times. A cam follower has the valves mounted thereon so that the valves assume the requisite positions in accordance with the camming surface followed by the cam follower. The valves therefore control the admission of pressures to the brake pressure modulator so that the vehicle wheel brakes are ultimately controlled in accordance with the signals generated by the sensing unit.

Figure 2:
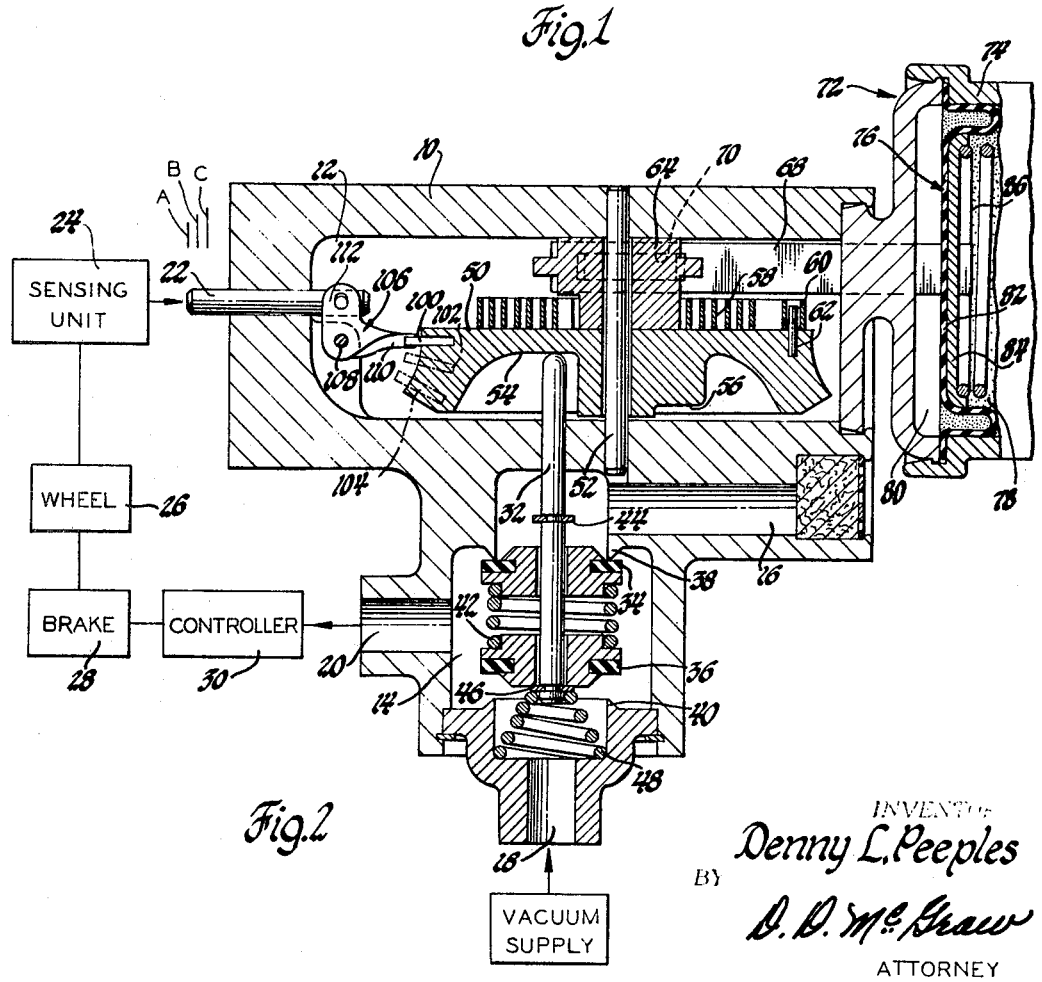

In the drawing:

FIGURE 1 is a cross section view of a valve assembly embodying the invention and particularly showing the power mechanism by which the valve operating cam is powered; and FIGURE 2 includes a cross section view of the mechanism of FIGURE 1 taken in the direction of arrows 2—2 of that figure, and also includes a schematic representation of a system in which the valve assembly may be utilized.

The assembly includes a housing 10 formed to provide a cam chamber 12, a valve and pressure mixing chamber 14, an atmospheric air input passage 16 and a vacuum pressure input passage 18 connected to chamber 14, and a pressure output passage 20 also connected with chamber 14. A push rod 22 is mounted in the housing 10 and extends into the cam chamber 12. This rod is illustrated as being connected with the brake system condition sensing unit 24 to receive signals therefrom and to be positioned accordingly. The position lines A, B and C illustrated in FIGURE 2 correlate with the outer end of the push rod 22 to illustrate the first, second and third positions set by the sensing unit 24 and utilized as hereinafter described.

In the schematic system illustrated the sensing unit 24 is suitably connected to a vehicle wheel 26 which is provided with a wheel brake 28 suitably controlled by a controller 30. The controller may be a wheel brake pressure modulator functioning as do the modulators of the above-noted applications. The wheel brake 28 may be actuated in the same manner as the wheel brake mechanisms of the above-noted applications.

When the valve assembly embodying the invention is utilized in a brake anti-lock system of the type referred to above, the controller 30 when inactive permits full brake pressure from a master cylinder unit to be applied to the wheel brake 28 until the sensing unit 24 senses a signal requiring release of the wheel brake pressure. The controller 30 is maintained in an inactive position by vacuum supplied through passages 18 and 20 so long as passage 16 is not fluid connected to chamber 14. Another signal from the sensing unit ultimately causes the controller 30 to be actuated to hold the wheel brake pressure at a lower level. Release of the brake pressure is accomplished by closing off the vacuum supply to the controller and admitting atmospheric air pressure thereto. When the sensing unit 24 signals that a brake hold position is desired, both atmospheric pressure and vacuum pressure are disconnected from the controller and the controller is maintained at some intermediate pressure. When the sensing unit 24 signals that the wheel brake pressure should be reapplied, vacuum pressure is again admitted to the controller 30 to return it to the inactive position.

The valve unit shown in FIGURE 2 accomplishes the above operations. A valve rod and cam follower 32 extends into the cam chamber 12 at the cam follower end and into the chamber 14 to provide a mount for the air valve 34 and the vacuum valve 36. These valves are positioned within the valve chamber 14 so that they can cooperate with their respective valve seats 38 and 40, through which passages 16 and 18 respectively connect with chamber 14. The valves 34 and 36 are illustrated as being slidably mounted on the valve rod portion of the rod and follower 32. The valves are urged apart by spring 42 and are provided with respective valve stops 44 and 46 which limit valve movements under the force of spring 42. Stop 46 is on the end of valve rod 32 opposite the cam follower end and is engaged by a spring 48 reacting against a part of the valve housing and urging the valve rod and cam follower 32 upwardly so that the follower remains engaged with the cam, as will be described. When the cam follower and valve rod is in the uppermost position shown in FIGURE 2, valve 34 is seated against its seat 38 by the force of spring 48, and valve 36 is spaced from its valve seat 40.

The cam mechanism for operating the valves includes a rotatable cam 50 positioned in chamber 12 and mounted on shaft 52. The cam is provided with a ramp engaged by the cam follower end of the valve rod and cam follower 32, and this ramp is provided with multiple levels corresponding with the various desired valve positions. The camming surface level 54 shown engaged by the cam follower 32 is the level which causes valve 34 to be closed and valve 36 to be open. The camming surface level 56 is the level which causes valve 34 to be open and valve 36 to be closed. An intermediate level on the ramped camming surface causes both valves to be closed. The cam 50 has a mainspring 58, which may be of the type utilized to power clocks and other windup mechanisms. One end 60 of the spring 58 is suitably secured to the cam as by pin 62. The other end of the spring is secured to a ratchet wheel 64 which is also rotatably mounted on shaft 52. As is best seen in FIGURE 1, the teeth of the ratchet wheel 64 are so arranged in cooperation with a pawl 66 to permit the ratchet wheel to rotate only in a spring winding direction. An arm 68 is provided with a suitable notch 70 so that one edge of the notch engages a tooth of the ratchet wheel 64. When the arm 68 is moved to the right as seen in FIGURE 1, the ratchet wheel is rotated clockwise, this action being permitted by pawl 66. Sufficient rotation of the ratchet wheel 64 causes the pawl 66 to be positioned behind the next tooth, therefore holding the ratchet wheel against the stored force in the spring 58. The arm 68 may then move to the left, riding over another tooth, and be positioned to repeat the process.

A spring power assembly 72 includes a housing section 74 formed to mount a power wall 76 in place so that the power wall is exposed on one side to a chamber 78 suitably connected to the vacuum supply also connected to valve input pressure passage 18. The other side of the power wall 76 is exposed to atmospheric pressure in chamber 80. The power wall is illustrated as being a diaphragm assembly. The flexible diaphragm 82 has a center plate 84 against which a compression spring 86 is seated. This spring urges the power wall to the left, and since arm 68 is secured to the power wall, it also urges that arm to the left. A power wall control valve assembly 88 is provided in the power wall. The valve 90 is positioned on the diaphragm side of the power wall so that it can seat about the power wall opening 92 to seal the power wall against leakage. The valve 90 has a rod 94 extending through the opening 92 and suitably constructed to prevent excess valve opening movement. A spring 96 is positioned in the opening 92 to urge the valve 90 toward the open direction. When the valve 90 is seated as shown in FIGURE 1, the differential pressure thereacross overcomes the spring 96 and holds the valve seated. The differential pressure acting across the entire power wall moves the power wall and arm 68 to the right, advancing the ratchet wheel 64 to wind the spring 58. At the right end of the stroke of the power wall, the valve rod 94 engages the housing section 74, opening the valve 90. Spring 96 will then hold the valve open and the pressure differential acting on the power wall 76 will be sufficiently decreased so that spring 86 moves the power wall to the left. At the leftward end of the power wall movement, valve 90 engages the housing surface 98, closing the valve. Chamber 78 is then sealed and evacuated to a lower pressure, establishing a sufficient pressure differential across power wall 76 to again move the power wall to the right. This cycle will continue until spring 58 is wound so tightly that the differential pressure acting on the power wall 82 is unable to further move the ratchet wheel. Therefore this stalling action of the spring power assembly 72 will prevent the spring 58 from being wound too tightly. As power is used by the cam 50, the power stored in the mainspring will decrease and the power wall 76 will again stroke as necessary to replenish the spring power.

The cam 50 also acts as an index wheel and is provided with stops, herein illustrated as pins 100, 102 and 104, which are positioned in accordance with the camming surface levels earlier described and cooperate with a cam positioning stop member to hold the cam in the desired position. As is illustrated, pin 100 is aligned on cam 50 in one rotational plane, pin 102 is slightly below it in another rotational plane, and pin 104 is slightly below pin 102 in a third rotational plane. A bellcrank 106 is mounted on a pivot pin 108 in chamber 12 so that the bellcrank arm 110 is selectively aligned to be engaged by one of the pins 100, 102 and 104. In the position illustrated, the arm 110 is engaged by pin 100 so that the cam is stopped in a position wherein the camming surface level 54 permits the valve 34 to be closed and the valve 36 to be open. The other arm 112 of the bellcrank 106 is suitably connected to the push rod 22 so that when the push rod is moved from position A to position B, the bellcrank is pivoted to position arm 110 out of alignment with pin 100 and into alignment with pin 102. This releases the cam 50, allowing it to be rotated by spring 58 until pin 102 strikes arm 110. This positions the intermediate camming surface level in relation to the cam follower 32 so that both valves 34 and 36 are closed. When the sensing unit 24 generates a signal causing push rod 22 to be moved to position C, the bellcrank 106 is further pivoted so that arm 110 is in alignment with pin 104, again releasing the cam 50 so that the cam is rotated by spring 58 until the camming surface level 56 is aligned with the cam follower 32. This action causes valve 34 to open while valve 36 remains closed. When the sensing unit repositions push rod 22 at position A, the bellcrank 106 is returned to the position illustrated and the cam again rotates until pin 100 engages arm 110. The valves 34 and 36 are then returned to the positions shown.

The mechanism embodying the invention is capable of utilizing small power signals and converting these signals into high-strength signals sufficient to operate valves controlling different pressures in accordance with the smaller signals. The cam utilized for power operation is always provided with sufficient available power to be operated. The valve system may be utilized with other types of control systems than brake anti-lock systems and may be arranged so as to receive different types of signals. It also may be used to control different level positive pressures as transmitted by either a liquid or gaseous medium.

What is claimed is:
1. For use in a vehicle wheel brake control system having a sensing unit generating brake control signals in accordance with a braking condition to be controlled and vehicle wheel brake means including a wheel brake controller, the improvement comprising: a valve assembly for said controller adapted to selectively deliver to said controller first and second different pressures and pressures intermediate the first and second pressures, said valve assembly including:

first and second pressure input passages,
a pressure output passage adapted to be connected to said controller,
a pressure mixing chamber having said input and output passages connected therewith and having therein first and second valves respectively controlling said first and second input passages,
and valve control mechanism including:
  a valve rod and cam follower extending into said mixing chamber and having said valves mounted thereon so that in a first cam follower position said first valve is closed and said second valve is open and in a second cam follower position said first and second valves are closed and in a third cam follower position said first valve is open and said second valve is closed,
  a cam having a multi-level camming surface engaged by said cam follower and rotatable to first and second and third positions to move said cam follower accordingly.
  a mainspring connected to said cam at one end and having a spring winding mechanism connected to the other end thereof,
  power means actuating said spring winding mechanism to maintain sufficient power stored in said spring to rotate said cam,
  and brake control signal receiving means adapted to receive said signals from said sensing unit and establish the rotational position of said cam accordingly.

2. The mechanism of claim 1, said power means including a power wall having said first and second pressures acting on opposite sides thereof and having an arm connected thereto,
said spring winding mechanism being a ratchet wheel having a pawl limiting movement of said ratchet wheel to one rotatable direction and connected with said power means arm to be moved in said one direction by said power wall to wind said mainspring until the resistance of said mainspring can no longer be overcome by the pressures acting on said power wall, and power wall reversing means causing said power wall to stroke in opposite directions to step said ratchet wheel.

3. A control valve assembly comprising:

a valve unit having a plurality of control positions;

a movable cam having a camming surface with levels corresponding to the valve unit control positions;

a cam follower and valve positioner engaging said camming surface and setting a valve unit position corresponding to the camming surface level engaged;

cam position control means receiving desired cam position signals and positioning said cam accordingly and including:

a cam power spring for moving said cam in accordance with said desired cam position signals, power means maintaining said cam power spring sufficiently charged to move said cam, stop members on said cam each of which corresponds with one of the camming surface levels and each one being positioned in a different alignment, and cam stop means adjustably positionable in line with a selected stop member to engage a selected one of said stop members upon movement of said cam by said cam power spring, said cam stop means being adjustably positioned in accordance with the desired cam position signals.

References Cited

UNITED STATES PATENTS 3,105,518   10/1963   Kunz _____ 137—624.14
3,416,843   12/1968   Kobnick _____ 303—56

FOREIGN PATENTS 975,252   11/1964   Great Britain.

MILTON BUCHLER, Primary Examiner

J. J. McLAUGHLIN, Jr., Assistant Examiner

U.S. Cl. X.R.

137—624.14; 251—251; 303—21, 56, 68